United States Patent [19]

Lewis et al.

[11] Patent Number: 4,566,011
[45] Date of Patent: Jan. 21, 1986

[54] PALINDROMIC POLYPHASE CODE EXPANDER-COMPRESSOR

[75] Inventors: Bernard L. Lewis, Fort Washington; Frank F. Kretschmer, Jr., Laurel, both of Md.

[73] Assignee: The United States of America as represented by the Secretary of the Navy, Washington, D.C.

[21] Appl. No.: 512,045

[22] Filed: Jul. 8, 1983

[51] Int. Cl.$^4$ ............................................. G01S 13/28
[52] U.S. Cl. .......................... 343/17.2 PC; 343/5 FT
[58] Field of Search ..................... 343/17.2 PC, 5 FT; 364/726

[56] References Cited

U.S. PATENT DOCUMENTS

| | | | |
|---|---|---|---|
| 4,237,461 | 12/1980 | Cantrell et al. | 343/17.2 PC |
| 4,241,347 | 12/1980 | Albanese et al. | 343/17.2 PC X |
| 4,313,170 | 1/1982 | Lewis et al. | 343/17.2 PC X |
| 4,328,495 | 5/1982 | Thue | 343/17.2 PC |
| 4,333,080 | 6/1982 | Collins et al. | 343/17.2 PC |
| 4,359,736 | 11/1982 | Lewis | 343/17.2 PC |
| 4,384,291 | 5/1983 | Lewis et al. | 343/17.2 PC |
| 4,404,562 | 9/1983 | Kretschmer, Jr. et al. | 343/17.2 PC |
| 4,507,659 | 3/1985 | Lewis et al. | 343/17.2 PC |
| 4,509,051 | 4/1985 | Lewis | 343/17.2 PC |
| 4,513,289 | 4/1985 | Kretschmer | 343/17.2 PC |
| 4,521,779 | 6/1985 | Lewis | 343/17.2 PC |
| 4,524,362 | 6/1985 | Lewis | 343/17.2 PC |
| 4,524,363 | 6/1985 | Kretschmer | 343/17.2 PC |

OTHER PUBLICATIONS

Linear Frequency Modulation Derived Polyphase Pulse-compression Codes and an Efficient Digital Implementation, B. L. Lewis and F. F. Kretschmer, Jr., NRL Report 8541, Nov. 2, 1982.
A New Class of Polyphase Pulse Compression Codes and Techniques, B. L. Lewis and F. F. Kretschmer, Jr., IEEE Transactions on Aerospace and Electronic Systems, vol. AES-17, No. 3, May 1981.

Primary Examiner—T. H. Tubbesing
Assistant Examiner—Gilberto Barrón, Jr.
Attorney, Agent, or Firm—Robert F. Beers; William T. Ellis

[57] ABSTRACT

A digital pulse expander-compressor for generating polyphase coded pulses which are highly doppler tolerant and have autocorrelation functions which are identical under frequency sweep reversal. The expander-compressor comprises an input expansion circuit for generating N replicas of a pulse to be expanded, a matched filter FFT with phase weights disposed in each input thereto, and phase inverters disposed in every other output therefrom, and a time dispersion circuit for appropriately adding the pulses from the FFT output to yield an expanded or compressed pulse. The phase weights to be inserted at the inputs to the FFT are determined by the equation $\phi_n = \pm \pi(n-\frac{1}{2})^2/\rho$ for a PP-3 code or $\phi_n = \pm[\pi(n-\frac{1}{2})^2/\rho - \pi(n-\frac{1}{2})]$ for a PP-4 code, where $\rho$ is the pulse compression ratio and n varies from 1, 2, 3 ... $\rho$.

18 Claims, 3 Drawing Figures

PALINDROMIC POLYPHASE CODE EXPANDER-COMPRESSOR

BACKGROUND OF THE INVENTION

The present invention relates generally to pulse compressor systems, and more particularly to pulse compressor systems for generating palindromic polyphase codes.

It is well known in the art of pulse radar systems that in order to obtain a good detection capability against a background of noise, a pulse with a large energy content must be transmitted. Since radar systems are generally peak-power-limited systems, the required energy needed for good detection capability can only be obtained by transmitting a longer pulse. In order to retain radar resolution (range) when transmitting a long pulse with a high average power content, pulse compression techniques are employed. In order to effect such pulse compression, a long pulse typically containing some form of linear-frequency-modulation or stepwise approximation to a linear-frequency-modulation is transmitted. A special pulse compressor or matched filter designed to compress the particular coding on the long pulse is then utilized at the receiver to compress the pulse to permit separation of adjacent range resolution cells.

In many radar applications, it is desirable to change waveform from pulse-to-pulse without changing the characteristics of the matched filtered signal. This is particularly the case in range-doppler-coupled MTI systems.

In general, MTI radar systems are utilized to distinguish between fixed targets and moving targets by means of the doppler effect. Such systems are based on the fact that the radar signal echo reflected from a moving object changes in phase from pulse to pulse due to the radial velocity of the target (the velocity toward or away from the radar receiver). Fixed objects, however, introduce no phase changes from pulse to pulse in the radar echo signal. Thus, fixed and moving targets may be distinguished by comparing the phases of successive echos via a subtraction process. In this subtraction, fixed target echos cancel but moving targets do not cancel due to the phase change from pulse to pulse. Unfortunately, such MTI also cancel echos from targets moving at rates that produce phase changes of integral multiples of $2\pi$ radians from pulse to pulse. These velocities are called blind speeds. This phase change process referred to above also produces what is known in the art as range-doppler-coupling in compressed frequency coded waveforms. When range-doppler-coupling is present, the range at which an echo appears will vary the targets doppler in an direction determined by the sign of the doppler shift (the direction of the target motion) and by the direction of the radar's frequency sweep on transmission. This range-doppler-coupling phenomena is also used to develop MTI systems without blind speeds.

Most prior art range-doppler-coupling MTI systems utilize a two pulse technique to detect moving targets. This technique comprises transmitting either simultaneously or back-to-back an upswept chirp or stepped approximation to a chirp and a downswept chirp or stepped approximation thereto. By way of example, see U.S. Pat. No. 3,905,033 to Moore et al.

It can be seen that in order to effect an accurate subtraction of these two pulses so as to cancel nonmoving target echos and to yield only moving targets, it is highly desirable to have upswept coded pulses and downswept coded pulses which have almost identical autocorrelation function characteristics. In the general case, it is highly desirable to provide coded pulses whose autocorrelation functions are identical under frequency sweep reversal but where the cross-correlation between non-frequency sweep reversed and frequency sweep reversed waveforms is very low.

An additional requirement based on the coding for the waveform is that the waveform must be highly doppler tolerant. If the pulse modulation code is not sufficiently doppler tolerant, then at high doppler frequencies, (doppler freq.$=2$ v/$\lambda$) very high sidelobes frequently referred to as grating lobes will be generated in the compressors. Accordingly, weak echos reflected from moving targets may be masked by these uncancelled sidelobes from strong moving targets thereby decreasing the probability of detection of weak targets by the MTI radar system.

In the prior art, only one polyphase waveform, i.e. the P-2 polyphase code disclosed in the paper "A New Class of Polyphase Pulse Compression Codes and Techniques" by B. L. Lewis and F. F. Kretschmer, Jr., IEEE Transactions on Aerospace and Electronic Systems, Vol. AES-17, No. 3, May 1981, and U.S. patent application Ser. No. 143,399 has the characteristic of having an identical correlation function under frequency sweep reversal. However, the P-2 is derived from the step approximation to the linear frequency modulation code which is known to have inherently poor doppler tolerance at high doppler frequencies. Specifically, it is known that the P-2 code generates grating lobes which maximize for doppler shifts equivalent to range doppler coupling of $p^{\frac{1}{2}}/2$, i.e. when the doppler shift is on the order of one half of the fundamental frequency, where the fundamental frequency is equal to the spacing between contiguous frequencies.

Accordingly, any system using the P-2 code will be inherently limited to small doppler shifts. Moving targets with large doppler shifts may mask smaller moving target echos by their grating lobes.

OBJECT OF THE INVENTION

Accordingly, it is an object of the present invention to generate a polyphase code whose autocorrelation functions are identical under frequency sweep reversal and which is simultaneously highly doppler tolerant.

It is a further object of the present invention to generate a polyphase code which is symmetrical about its phase center and is simultaneously highly doppler tolerant.

It is yet a further object of the present invention to reverse the transmitted waveform and the attendant matched filter from pulse-to-pulse in a radar system without changing the compressed echo characteristics thereof.

SUMMARY OF THE INVENTION

Briefly, the above and other objects are achieved in the present invention which comprises an input-signal expansion circuit responsive to an applied pulse for successively generating N replicas y(n) of the pulse, where n$=1, 2, 3, \ldots$ N, and N is an integer; a matched filter weighting circuit connected to the input-signal expansion circuit and having N output terminals, wherein the weighting circuit operates to weight the replicas y(n) with predetermined weights to effect a discrete Fourier Transform processing of the replicas; and a time dispersion circuit connected to the weighting circuit for appropriately delaying each of the N weighted pulses to effect an expansion or a compression; wherein the predetermined weights of the weighting circuit are chosen so that in the expansion mode a polyphase code equivalent to the sample values obtained by sampling at the Nyquist rate a coherently detected linear-frequency-modulated waveform starting one-half of a Nyquist sample period after the leading edge of the waveform occurs.

In one embodiment of the present invention, the predetermined weights include a set of phase weights, one phase weight of each replica y(n), wherein the phase weights are defined by the equation $\phi_n = \pi(n-\frac{1}{2})^2/\rho$, where $\rho$ is the pulse compression ratio and $n=1,2,3\ldots p$. These weights are used for an up frequency sweep and thus negative values are used for a down sweep.

A second embodiment of the present invention is defined wherein the predetermined weights include a set of phase weights, with one phase weight for each replica y(n), wherein the phase weights are defined by the equation $\phi_n = [\pi(n-\frac{1}{2})^2/\rho] - [\pi(n-\frac{1}{2})]$, where $\rho$ is the pulse compression ratio. Again, these weights are used for an up sweep and their negative values for a down sweep.

In a preferred embodiment of the present invention, the weighting circuit includes a discrete Fast Fourier Transform circuit, and further includes a plurality of inverters, a different inverter being connected to every other output of the Fast Fourier Transform circuit. The phase weights of the present invention are implemented by a series of phase shifters, with a different phase shifter from the plurality of phase shifters being connected to each of the N replica inputs to the FET circuit.

The compression-expansion circuit defined above is capable of generating a polyphase code which is symmetrical about its phase center so that is has autocorrelation functions which are identical under frequency sweep reversal. This code also has the characteristic of being simultaneously highly doppler tolerant thereby preventing the masking of weak target reflection signals by the grating lobes of large target echos due to the pulse compression waveform.

DETAILED DESCRIPTION OF THE EMBODIMENT

Figure 1:
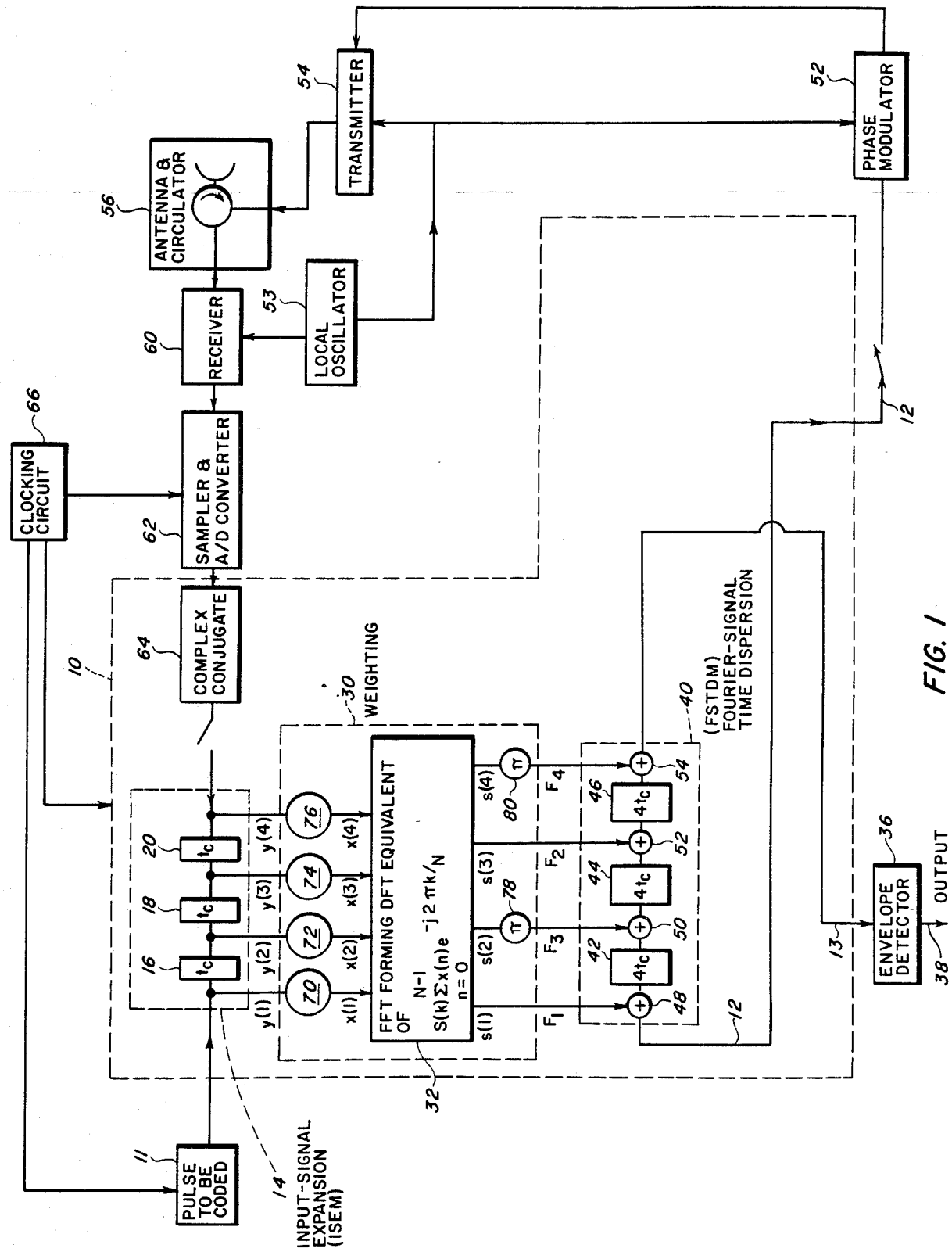
FIG. 1 is a schematic block diagram of one embodiment of the present invention.

The present invention is directed to generating polyphase codes which are symmetrical about their phase centers such that their autocorrelation functions are identical under frequency sweep reversal. Additionally, these codes must be simultaneously highly doppler tolerant. It is known in the art that the most doppler tolerant of all polyphase codes are those codes which are derived from a linear frequency modulated waveform or chirp signal. Two such polyphase codes are the P-3 and the P-4 codes disclosed in NRL Report 8541 entitled "Linear Frequency Modulation Derived Polyphase Pulse-Compression Codes and An Efficient Digital Implementation" by B. L. Lewis and F. F. Kretschmer, Jr., dated Nov. 2, 1981, (approved for public release, distribution unlimited). The code expander-compressors disclosed in this report are also covered by United States patent applications. More specifically, the P-3 expander-compressor of FIG. 1 of the report is set forth in application Ser. No. 377,107 by B. L. Lewis, and the P-4 expander-compressor of FIG. 2 of the report is convered by application Ser. No. 420,209 filed on Sept. 20, 1982, by B. L. Lewis. The aforementioned NRL Report 8541 is hereby incorporated by reference into this specification.

As described in the NRL Report 8541, the P-3 code is conceptually obtained by coherently detecting a linear-freqency-modulated waveform with a local oscillator with a frequency equal to a band edge of the waveform and sampling this waveform in I and Q at the Nyquist rate starting at the leading edge of the waveform. Likewise, the P-4 code is derived in a similar manner, but in the case of the P-4 code, the local oscillator is placed in the middle of the waveform spectrum. Both of these codes yield complex autocorrelation functions which are highly doppler tolerant, but which are not identical on frequency sweep reversal. Accordingly, it is not possible to generate an up chirp in the P-3 code in conjunction with a down chirp in the P-3 code or followed by a down chirp in the P-3 code and then to subtract the autocorrelation functions of the echos from the up chirp and the down chirp to cancel echos from nonmoving targets. Although the down chirp is merely the frequency sweep reversal of the autocorrelation function for the up chirp, the autocorrelation functions under frequency sweep reversal for the P-3 code are not identical and thus the echos therefrom will have different characteristics. The same is true for the P-4 code. Accordingly, optimum results cannot be obtained when subtracting the autocorrelation function of a P-3 code echo or a P-4 code echo from its frequency sweep reversed autocorrelation function.

The present invention is specifically directed to altering the highly doppler tolerant P-3 and P-4 codes so that they are palindromic, i.e. so that these codes are symmetrical about a phase center such that their autocorrelation functions are identical under frequency sweep reversal.

The present inventors have discovered that it is possible to generate codes similar to the P-3 and P-4 codes whose autocorrelation functions are not changed by frequency sweep reversal. These codes, referred to as the PP-3 and PP-4 codes are obtained conceptually by starting the Nyquist rate sampling of the coherently detected linear-frequency-modulated-waveform one-half of a Nyquist sample period after the leading edge of the waveform. This technique produces polyphase codes that read the same with and without frequency sweep reversal such that there is mirror symmetry about the phase center of the code period.

Referring now to the drawings, wherein like reference characters designate like or corresponding parts throughout the views, FIG. 1 is a schematic diagram of one embodiment of the present invention. The digital phase coded pulse expander-compressor disclosed in this drawing is similar to the compressor shown in U.S. Pat. No. 4,237,461 with the addition of the phase shifters 70, 72, 74 and 76, and the inverters 78 and 80 and a redesign of the signal time dispersion circuit. U.S. Pat. No. 4,237,461 referred to above is hereby incorporated by reference into this specification. In essence, in the present design the phase weights set in the phase shifter 70-76 and the inverters 78 and 80 perform two functions. First, these phase weights permit a polyphase code to be generated which is derived from a linear frequency modulated waveform, i.e. they provide the phase shifts to match the phase changes that occur with the continuously changing frequency in the FM chirp. Secondly, these phase weights make this polyphase code symmetrical about its phase center.

The embodiment of the invention shown in FIG. 1 is described in the context of a pulse-compressor radar. The components of the invention are disclosed in the dashed line box 10. Briefly, the overall transmitting circuit comprises a pulse generator 11 which is clocked in accordance with a clocking circuit 66. Pulses from this pulse generating circuit 11 are applied to the pulse expander-compressor shown in the dashed line box 10. The dashed line box 10 operates to significantly expand the input pulse from the pulse generator 11 and to apply a polyphase code thereto which is both highly doppler tolerant and which has autocorrelation functions which are identical under frequency sweep reversal. The polyphase code output is applied on line 12 to a phase modulator 52. The phase modulator 52 phase modulates a carrier frequency with the polyphase code in accordance with a signal from a local oscillator 53. The resultant modulated signal is applied from the phase modulator 52 to a transmitter 54. The signal from the transmitter 54 is applied to one input of an antenna and circulator 56 wherein the signal is radiated into a desired volume.

The echo from this radiated polyphase code signal is received by the antenna and circulator 56 and applied to a receiver 60. The receiver 60 converts the incoming echo signal to an intermediate frequency signal in accordance with the local oscillator signal from the block 53. The intermediate frequency signal from the receiver 60 is coherently detected and then applied to samplers and A/D converters 62 in baseband I and Q form. The sampler and A/D converter 62 is operating to sample at the Nyquist rate in accordance with a signal from the clocking circuit 66. A sampled baseband signal is realized at the output of the sampler and A/D converter 62. This baseband signal is then applied to the expander-compressor 10 for purposes of compression.

The present expander-compressor 10 will be described in terms of a 16 element polyphase code by way of example. It should be understood however, that the present invention is in no way limited to a 16 element code, but may be implemented in a wide variety of code lengths.

Additionally, the present invention will be implemented utilizing a Fast Fourier Transform circuit in the weighting circuit. It again should be understood that the weighting circuit for the 16 element code may be implemented in other configurations such as, for example, a 16 tap pipeline circuit, or by means of a discrete Fourier Transform circuit.

Referring now to the expander-compressor 10 shown in FIG. 1, it comprises an input expansion circuit 14, a weighting circuit 30, and a signal time dispersion circuit 40. The input-signal expansion circuit 14 is designed in order to provide N replicas of the input pulse to be expanded where $N^2 = \rho$, where $\rho$ equals the pulse compression ratio, or the number of code elements, in the present example 16. In order to obtain the N replicas of the input pulse from the pulse generator 12, three delay circuits 16, 18, and 20 are utilized. These delay elements set the time spacing between the individual samples. This time spacing, $t_c$, may be arbitrary. However, the delay parameter $t_c$ is preferably made equal to the sampling rate of the I and Q sampler 62. In a preferred embodiment, the sampling rate is made equal to the reciprocal of the transmitted pulse bandwidth (reciprocal of the Nyquist rate). All of the elements in the compressor/expander circuit of FIG. 1 should then be shifted at this same rate, the Nyquist rate.

The weighting means 30 may be formed, as noted above, by a Fast Fourier Transform circuit 32 which merely implements the standard discrete Fourier transform equation $$S(k) = \sum_{m=0}^{k-1} X(n\ e^{-j2\pi nK/N}$$

Such fast Fourier Transform circuits are well known in the art and are typically implemented by steering filter matrices. An example of one such steering filter matrix is set out and will be discussed in relation to FIG. 2 and FIG. 3.

It well known that Fast Fourier Transform circuits can be viewed as acting as comb frequency filters. Accordingly, Fourier Transform and Fast Fourier Transform circuits are especially suited for generating and compressing polyphase codes which are derived from stepped approximation to linear frequency modulation waveforms (stepped chirps). The most notable of these stepped chirp derived codes are the Frank code and the aforementioned P-1 and P-2 codes. The P-3 and P-4 codes upon which the present PP-3 and PP-4 codes are based differ from the Frank code by $\pi$ phase shifts every $\rho^{\frac{1}{2}}$ elements and by added phase increments from code element to code element that repeat every $\rho^{\frac{1}{2}}$ samples. These added phase shifts are caused by the fact that the P-3 and P-4 codes are derived from a linear frequency modulation waveform. Thus, there is a continuous frequency change during the time when the equivalent Frank code frequency is a constant.

In order to convert the output signals s(1)-s(4) from the FFT 32 to be equivalent to the Nyquist rate sampling of a coherently detected linear-frequency-modulated waveform which is sampled $\frac{1}{2}$ of a Nyquist sample after the leading edge of the waveform, special phase weights are inserted in the input lines and output lines of the FFT circuit 32. More specifically, a different phase weight 70, 72, 74 or 76 is disposed in the line connecting each individual tap to an input port of the FFT circuit 32. These phase weights provide the added phase increments from code element to code element to obtain a linear chirp derived code. Additionally, these phase shifts have been specially derived in order to ensure that the resultant polyphase code is symmetrical about its phase center. A set of inverters 78 and 80 are disposed in every other output line from the FFT circuit 32, i.e. the $F_2$ and $F_4$ frequency ports, in order to implement the $\pi$ phase shifts every $\rho^{\frac{1}{2}}$ elements as required to obtain the linear chirp derived code.

There are four output lines $F_1$, $F_2$, $F_3$, and $F_4$ from the weighting circuit 30. These output lines are applied to the signal time dispersion circuit 40. This time dispersion circuit 40 comprises a delay line having a series of N minus 1 delay elements 42, 44, and 46, with delays of $Nt_c$ for each element. In the present case with $N=4$, each delay is equal to $4t_c$. A set of adder elements 48, 50, 52, and 54 are disposed before each of the delay elements and after the last delay element 46. These adder elements 48–54 constitute the taps into the delay line forming the time dispersion circuit 40. The four output lines from the weighting circuit 30 are connected each to a different one of the adder elements 48, 50, 52 and 54, as shown in FIG. 1.

In the expansion mode, the present circuit operates as follows. An input pulse from the pulse generator 12 is clocked into the input signal expansion circuit 14. This short pulse propagates through the delay elements 16, 18, and 20 providing four separate replicas of the input pulse on the lines $y(1)$–$y(4)$. It can be seen that after four clock pulses, the input to the FFT 32 will be as follows, 1000, 0100, 0010, and 0001. Since each of the input lines to the FFT 32 contains its own specially set phase weight 70, 72, 74 or 76, each of the input lines will be appropriately phase weighted prior to its application to the FFT circuit.

The FFT circuit 32 then operates to steer these input signals within the FFT filter bank such that four samples of the frequency $F_1$ are obtained at the $F_1$ output port, four samples of the frequency $F_2$ are obtained at the $F_2$ output port, etc. Accordingly, four replica inputs to the FFT circuit are sufficient to generate 16 code elements. These sixteen code elements on the delay line of the time dispersion circuit 40 are then clocked out on the line 12 and applied to the phase modulator 52. The resulting polyphase signal is then transmitted via the transmitter 54 and the antenna and circulator 56.

In the receive or compression mode, a polyphase coded echo signal is obtained by the antenna 56 and converted to an intermediate frequency by the receiver 60. This intermediate frequency representation of the echo signal is then detected in I and Q by the sampler and A/D converter 62. The I and Q signals are fed to a conjugator circuit 64 which processes them to form their complex conjugates. The conjugate signals are fed back through the input-signal expansion circuit 14 in inverted order relative to the manner in which the original input pulse passed through the input-signal expansion circuit, i.e., the output line $y(4)$ now has no delay, $y(3)$ is delayed one clock interval, $y(2)$ is delayed two clock intervals, and $y(1)$ is delayed three clock intervals. The $y(1)$–$y(4)$ outputs from the delay line essentially constitute samples of the expanded echo pulse. These sample signals are again phase weighted by the specially chosen phase weights 70–76 and applied as inputs to the FFT circuit 32. The FFT circuit 32 appropriately steers these samples by means of its filter matrix and provides inputs to the four adder taps 48–54 of the signal time dispersion circuit 40. The signals on the taps for the delay line of the time dispersion circuit are then clocked out of the delay line to the right on line 13, i.e., in the opposite direction than for the expansion operation in order to provide delays which are inverted in order relative to the delays provided by the circuit 40 for the outgoing expanded pulses. Thus, no delay is inserted in the signal for the $F_4$ port, four units of delay are inserted in the $F_3$ port, eight units of delay are inserted in the $F_2$ port, and twelve units of delay are inserted in the $F_1$ port.

As the polyphase coded echo pulse is clocked into the delay line of the input-signal expansion circuit 14, various output signals will be received on the output line 13. When the polyphase coded echo signal is fully indexed into the delay line of the input-signal expansion circuit 14 (i.e. the sixteenth clock pulse interval), then a sharp pulse output with 16 times the magnitude of the uncompressed pulse will be obtained on the line 13. Line 13 is connected to an envelope detector 36. The detected envelope from the envelope detector 36 constitutes the output of the present circuit on line 38 in the compression mode. This output pulse constitutes the response of the matched filter.

Specific designs for generating the PP-3 and PP-4 codes will now be discussed. As noted in NRL Report 8541 referenced previously, the P-3 code is conceptually derived by converting a linear frequency modulation waveform to baseband using a local oscillator frequency on the end of the frequency sweep and sampling the in phase I and quadrature Q video at the Nyquist rate. Assuming that the waveform to be coherently detected has a pulse length T and a frequency $$f = f_o + kT,$$

where k is a constant, the bandwidth of the signal will be approximately $$B = kT.$$

This bandwidth will support a compressed pulse length of approximately $$t_c = 1/B,$$

and the waveform will provide a pulse compression ratio of $$\rho = T/t_c = BT.$$

As noted previously, in order to form the PP-3 code the derivation equation is set up so that the first sample of I and Q is taken at a point which is one half of a Nyquist sample after the leading edge of the waveform. The phases of successive samples of this waveform are taken $t_c$ apart, and thus the phase weights of the expander-compressor are determined by the following equation $$\phi_n^{(PP3)} = 2\pi \int_o^{(n - \frac{1}{2})t_c} [f_o + kt) - f_o] dt,$$

where $n = 1, 2, \ldots \rho$. Since $k = B/T$ and since $t_c = 1/B$, then the above noted equation can be written as $$\phi_n = \pi(n-\frac{1}{2})^2/\rho$$

for an up sweep. Negative values of $\phi_n$ are used for a down sweep. For $N=16$, the phase weight for $N=1$ is $\pi/64$, for $n=2$ the phase weight is $2.25\ \pi/16$, for $n=3$ the phase weight is $6.25\ \pi/16$ and for $n=4$ the phase weight is $(12.25)\ (\pi/16)$. These phase weights are inserted in the phase weight blocks 70–76 of FIG. 2 which discloses one specific implementation of an expander-compressor for the PP-3 code. The input-signal expansion circuit 14 and the signal time dispersion circuit 40 are identical to those same circuits disclosed in FIG. 1. The FFT circuit 32 comprises a set of multiplier/adder circuits 116, 118, 120, 122, 124, 126, 128, and 130. The elements 116–130 each have two inputs applied thereto. These individual elements multiply each input thereto by the complex number immediately adjacent to the input line in the diagram. Then, the two multiplied inputs in the block are added together and applied on the output line thereof for each element. This type of fast Fourier Transform steering filter matrix is well known in the art. The steering of this Fourier Transform filter bank in conjunction with the phase weights 70-80, generates in the case of $\rho=16$, four samples of the frequency $F_1$ at the $F_1$ output port, four samples of the frequency $F_2$ at the $F_2$ output port, etc.

The PP-4 code is conceptually derived from the same waveform as the PP-3 code. However, in this case, the local oscillator frequency is set equal to $f_o+kT/2$ in the I, Q detector 62. With this frequency, the phases of the successive samples taken $t_c$ apart can be calculated with the following equation $$\phi_n^{(PP4)} = 2\pi \int_0^{(n-\frac{1}{2})t_c} \left[(f_o + kt) - \left(f_o + \frac{kt}{2}\right)\right] dt,$$

for an up sweep. Negative values of $\phi_n$ are used for a down sweep. where $n=1,2,\ldots \rho$. Therefore, this equation can be written as follows:

$$\phi_n^{(PP4)} = \pi(n-\tfrac{1}{2})^2/\rho - \pi(n-\tfrac{1}{2}).$$

It can be seen from an inspection of the above equation for calculating the phase weights for the PP-4 code that the phases will all be negative. However, since both the PP-3 and PP-4 codes are modulo $2\pi$ codes, positive phase weights may be obtained simply by adding an appropriate multiple of $2\pi$ of each phase weight. The phase weights for an expander-compressor with the compression ratio of $\rho=16$ are set forth as follows: for $n=1$ the phase weight is 97 $\pi/64$, for $n=2$ the phase weight is 10.25 $\pi/16$, for $n=3$ the phase weight is 30.25 $\pi/16$, and for $n=4$ the phase weight is 20.25 $\pi/16$.

Figure 2:
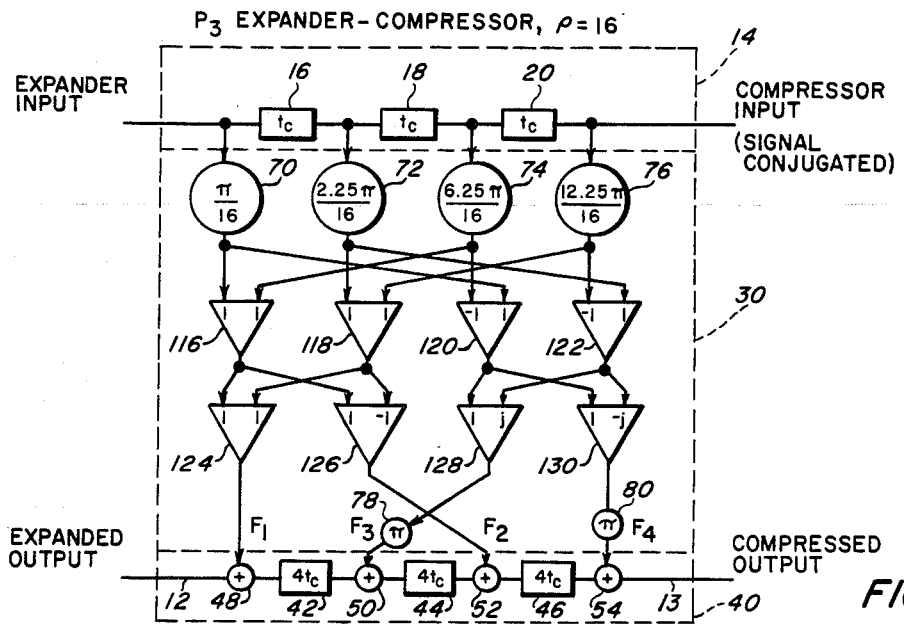
FIG. 2 is a schematic block diagram of the expander-compressor weighting circuit of FIG. 1 with the weights set to realize the PP-3 code.
Figure 3:
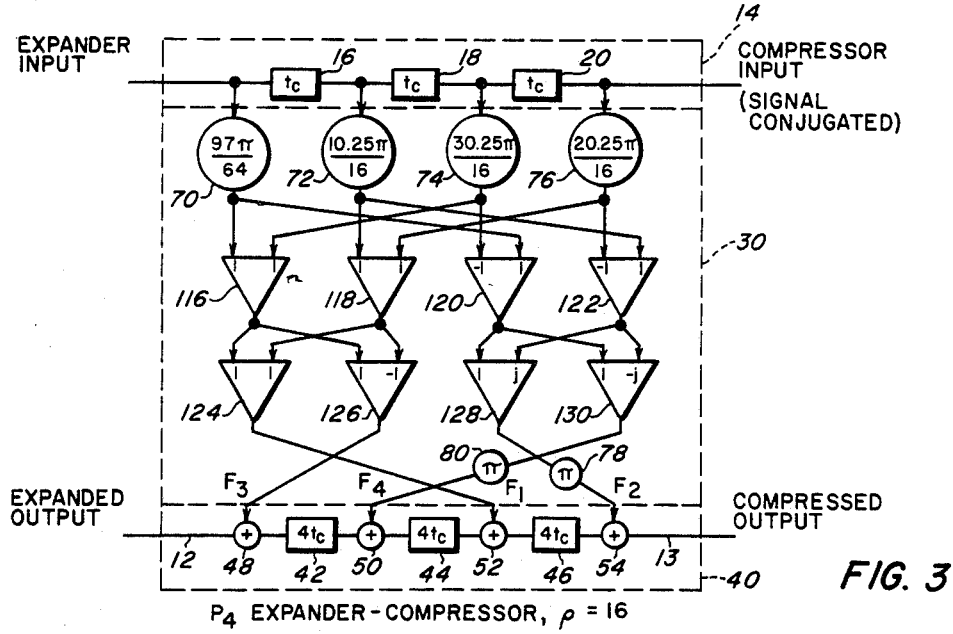
FIG. 3 is a schematic block diagram of a second embodiment of the expander-compressor with the weights set to realize the PP-4 code.

One embodiment of an expander-compressor for implementing the PP4 code is set forth in FIG. 3. A comparison of the circuit of FIG. 3 to the circuit of FIG. 2 shows that they are identical except for the phase weights set forth in the phase shifters 70-76, and in the connections of the outputs $F_1$-$F_4$ from the FFT weighting circuit 30 to the adders 48-54 in the delay line for the time dispersion circuit 40.

It is of course understood that the phases set forth in the phase weight elements 70-76 are set forth as examples only. The local oscillator for the circuit can start out with any arbitrary phase with respect to the phase of the incoming waveform in a compression mode. However, once the first element 70 has been given a phase weight, then all of the later phase weights are set relative to that first element.

As noted previously, the present invention has been described in the context of an expander-compressor with a compression ratio of $\rho=16$. It is again reiterated that the present invention is not limited in any fashion to such a compression ratio or to a 16 element code. The designer has the option of choosing a wide variety of pulse compression ratios and implementing such ratios by means of a wide variety input-signal expansion circuits. It is of course understood that the more delays which are inserted into the input-signal expansion circuit, the more the outgoing signal is time-expanded.

It should also be understood by one skilled in the art that the output from the sampler and A/D converter 62 is a complex number with an I and a Q video component. Accordingly, FIGS. 1-3 should include a second input signal expansion circuit 14 for operating on the Q component of the signal. All of the connector lines for the phase weight elements 70-80 and all of the connector lines in the FFT 32 and the output lines therefrom should be double lines in order to operate on the Q component of the signals. Additionally, the signal time dispersion circuit 40 should include an additional circuit to process the Q components of the signal. Since the processing and the connections for the Q component of the signal is identical to that shown in Figures for the I component of the signal, and since the display of these extra Q lines would greatly complicate the figures, these Q lines have been left off of the drawing for purposes of clarity.

It should be noted that the signal time dispersion circuit 30 must be capable of being clocked to the left in order to output on line 12 during the expansion mode and to be clocked to the right in order to output on line 13 in the compression mode. In order to obtain this capability, the delay circuits 42, 44 and 46 may be implemented by bidirectional shift registers if a digital shift register implementation is desired, or by two separate digital shift register delay lines for each component of the complex I and Q output. Additionally, these delay elements may be implemented simply by an ordinary analog delay line. Such analog delay lines have the ability of propagating a signal in both directions thereof.

It is noted by way of information, that although the PP3 and PP4 codes are highly doppler tolerant and have identical autocorrelation functions upon frequency sweep reversal, they have different responses to precompression bandlimiting effects. Such bandwidth limitations are found in most well-designed radar systems and are the result of attempts to maximize the signal-to-thermal noise ratio in the receiver. More specifically, when a receiver or amplifier is utilized with a bandwidth equal to the reciprocal of the length of one code element (the compressed pulse length), then abrupt phase shifts between code elements will cause amplitude modulation on the signals passing through the receiver. This amplitude modulation is due to the fact that the period of time required for a circuit such as a receiver to build up to a given amplitude is inversely proportional to the bandwidth of the circuit. A zero to $\pi$ phase shift requires the signal amplitude of the receiver to go to zero and then to build to the same signal amplitude but with a $\pi$ phase difference. This process takes a finite period of time which increase as the bandwidth decreases. Thus, when an abrupt phase changes of $\pi$ radians occurs in a code, the bandlimited receiver must de-ring and re-ring with the amplitude of the response going through zero with a non-infinite slope. The resulting amplitude modulation resulting from amplitude averaging acts to decrease the peak-to-range-time sidelobe response to the PP-3 code but increases it for the PP-4 code. This is because the PP-3 code has its highest phase increments from code element to code element in the middle of the coded pulse. Accordingly, the peak-to-sidelobe ratio resulting from recompression bandwidth limitations are not minimized with this code.

In contradistinction, the PP-4 code has the highest increments between code elements on the ends of the polyphase code pulse. Accordingly, if a PP-4 coded pulse is passed through a narrow band amplifier, the ends thereof will be attenuated due to the bandwidth limitations thus actually improving the ratio of the peak signal to the peak and the mean-squared sidelobes. Accordingly, it can be seen that the PP-4 code is the preferred code for the majority of applications due to its improved results when propagating through bandwidth limited equipment.

From the above, it can been seen that a plurality of new codes have been developed which are derived from the linear FM chirp. These codes are both highly doppler tolerant and are symmetrical about their phase centers such that the autocorrelation functions of the codes are identical under frequency sweep reversal. Thus, these codes are particularly well suited for range-doppler coupled MTI systems which transmit a chirp in one direction following by or simultaneous with the transmission of a chirp in the opposite direction. Accordingly, the MTI system can reverse its waveform and matched filter from pulse to pulse without changing its echo characteristics. In essence, these new codes and the expander-compressors developed therefor have frequency sweep reversal independence in conjunction with high doppler tolerance.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A digital pulse expander-compressor comprising:
   input-signal expansion means responsive to an applied pulse for successively generating N replicas y(n) of the pulse, where n=1, 2, 3, . . . N, and N is an integer;
   matched filter weighting means connected to said input-signal expansion means and having N output terminals, said weighting means operating to weight the replicas y(n) with predetermined weights to effect a discrete Fourier Transform processing of the replicas; and
   time dispersion means connected to said weighting means for appropriately delaying each of said N weighted pulses to effect an expansion or a compression;
   wherein said predetermined weights are chosen so that in the expansion mode a polyphase code equivalent to the sample values obtained by sampling at the Nyquist rate a coherently detected linear-frequency-modulated waveform one-half of a Nyquist sample period after the leading edge of the waveform is formed.

2. A digital pulse expander-compressor as defined in claim 1, wherein said weighting means includes a set of phase weights, one phase weight for each replica y(n), wherein said phase weights progressively increase in value.

3. A digital pulse expander-compressor as defined in claim 1, wherein said weighting means includes a set of phase weights, one phase weight for each replica y(n), wherein said phase weights are defined by the equation $\phi_n = \pm \pi(n-\frac{1}{2})^2/\rho$, where $\rho$ is the pulse compression ratio and n=1, 2, 3, . . . $\rho$.

4. A digital pulse expander-compressor as defined in claim 1, wherein said weighting means includes a set of phase weights, one phase weight for each replica y(n), wherein said phase weights are defined by the equation $\phi_n = \pm[\pi(n-\frac{1}{2})^2/\rho - \pi(n-\frac{1}{2})]$, where $\rho$ is the pulse compression ratio and n=1, 2, 3, . . . $\rho$.

5. A digital pulse expander-compressor as defined in claim 4, wherein said weighting means includes means for effecting said Fourier Transform processing via a Fast Fourier Transform.

6. A digital pulse expander-compressor as defined in claim 3, wherein said weighting means includes means for effecting said Fourier Transform processing via a Fast Fourier Transform.

7. A digital pulse expander-compressor as defined in claim 3, wherein said weighting means further comprises a plurality of phase inverters, a different inverter being connected to every other output of said weighting means.

8. A digital pulse expander-compressor as defined in claim 4, wherein said weighting means further comprises a plurality of phase inverters, a different inverter being connected to every other output of said weighting means.

9. A digital pulse expander-compressor for generating a polyphase code with real autocorrelation functions comprising:
   pulse coder means for providing a series of N essentially contiguous weighted pulses from a single input pulse, the time interval of the series being greater than that of the input pulse, said coder means including a weighting means;
   means for transmitting said series of contiguous weighted pulses and receiving echos therefrom reflected from a target;
   pulse compression means of the matched filter type for processing echo signals corresponding to the output signals of said coder means transmitted by said transmitting means, said pulse compression means including weighting means which is the same weighting means as that employed in said coder means;
   wherein said weighting means includes a discrete Fourier Transform circuit with N inputs and a plurality of phase shifter, a different phase shifter of said plurality of phase shifters being connected to each of the N inputs of the discrete Fourier Transform circuit, the phase shifts of said phase shifters being set so that in the expansion mode a polyphase code equivalent to the sample values obtained by sampling at the Nyquist rate a coherently detected linear-frequency-modulated waveform one-half of a Nyquist sample period after the leading edge of the waveform is formed.

10. A digital pulse expander-compressor as defined in claim 9, wherein said phase shifters connected to the inputs of said discrete Fourier Transform circuit have phase shifts defined by the equation $\phi_n = \pm \pi(n-\frac{1}{2})^2/\rho$, where n is an integer with n=1, 2, 3, . . . $\rho$, and $\rho$ is the pulse compression ratio.

11. A digital pulse expander-compressor as defined in claim 9, wherein said phase shifters connected to the inputs of said discrete Fourier Transform circuit have phase shifts defined by the equation $\phi_n = \pm[\pi(n-\frac{1}{2})^2/\rho - \pi(n-\frac{1}{2})]$, where n is an integer with n=1, 2, 3, . . . $\rho$, and $\rho$ is the pulse compression ratio.

12. A digital pulse expander-compressor as defined in claim 10, wherein said discrete Fourier Transform circuit is a Fast Fourier Transform circuit.

13. A digital pulse expander-compressor as defined in claim 11, wherein said discrete Fourier Transform circuit is a Fast Fourier Transform circuit.

14. A digital pulse expander-compressor as defined in claim 12, wherein said plurality of phase shifters in said weighting means includes a set of phase inverters, a different inverter being connected to every other output of said Fast Fourier Transform circuit.

15. A digital output expander-compressor as defined in claim 13, wherein said plurality of phase shifters in said weighting means includes a set of phase inverters, a different inverter being connected to every other output of said Fast Fourier Transform circuit.

16. A digital pulse expander-compressor comprising:
input signal expansion means responsive to an applied pulse for successively generating N replicas y(n) of the pulse, where n=1, 2, 3, ... N, and N is an integer, in a time which is N times the length of the pulse;
matched filter weighting means connected to the input-signal expansion means to receive N replica inputs therefrom and having N output terminals, said weighting means including a discrete Fast Fourier Transform circuit, a plurality a phase shifters, a different phase shifter from said plurality of phase shifters being connected to each of said N replica inputs to said FFT circuit, and a plurality of inverters, a different inverter being connected to every other output of said FFT circuit; and
a plurality of adders and delay stages connected in series, said adders alternating with said delay stages, each of said adders being connected to a different one of the N output terminals of said weighting means, each of said delay stages providing a delay which is N times the length of the applied pulse;
wherein the phase shifts of said plurality of phase shifters are set so that in an expansion mode a polyphase code equivalent to the sample values obtained by sampling at the Nyquist rate a coherently detected linear-frequency-modulated waveform one-half of a Nyquist sample period after the leading edge of the waveform is formed.

17. A digital phase expander-compressor as defined in claim 16, wherein said N phase shifters have phase shifts defined by the equation $\phi_n = \pm \pi(n-\frac{1}{2})^2/\rho$, where n is an integer with n=1, 2, 3, ... $\rho$, and $\rho$ is the pulse compression ratio.

18. A digital pulse expander-compressor as defined in claim 16, wherein said N phase shifters have phase shifts defined by the equation $\phi_n = \pm[\pi(n-\frac{1}{2})^2/\rho - \pi(n-\frac{1}{2})]$, where n is an integer with n=1, 2, 3, ... $\rho$, and $\rho$ is the pulse compression ratio.

* * * * *